United States Patent [19]
Ara et al.

[11] Patent Number: 5,317,710
[45] Date of Patent: May 31, 1994

[54] INVALIDATION OF ENTRIES IN A TRANSLATION TABLE BY PROVIDING THE MACHINE A UNIQUE IDENTIFICATION THEREBY DISALLOWING A MATCH AND RENDERING THE ENTRIES INVALID

[75] Inventors: Mari Ara, Isehara; Hideo Sawamoto; Ryo Yamagata, both of Hadano, all of Japan

[73] Assignee: Hitachi, Ltd., Tokyo, Japan

[21] Appl. No.: 681,446

[22] Filed: Apr. 3, 1991

Related U.S. Application Data

[63] Continuation of Ser. No. 222,767, Jul. 22, 1988, abandoned.

[30] Foreign Application Priority Data

Jul. 24, 1987 [JP] Japan .................. 62-183322

[51] Int. Cl.⁵ .................. G06F 12/02; G06F 7/04
[52] U.S. Cl. .................. 395/425; 364/256.3; 364/256.6; 364/255.8; 364/DIG. 1
[58] Field of Search .................. 395/425, 400, 500

[56] References Cited

U.S. PATENT DOCUMENTS

| | | | |
|---|---|---|---|
| 4,053,948 | 10/1977 | Hogan et al. | 395/400 |
| 4,426,682 | 1/1984 | Riffe et al. | 395/425 |
| 4,456,954 | 6/1984 | Bullions, III et al. | 395/400 |
| 4,682,281 | 7/1987 | Woffinden et al. | 395/400 |
| 4,714,990 | 12/1987 | Desyllas et al. | 395/425 |
| 4,731,739 | 3/1988 | Woffinden et al. | 395/250 |
| 4,779,188 | 10/1988 | Gum et al. | 395/500 |
| 4,802,084 | 1/1989 | Ikegaya et al. | 395/400 |
| 4,812,969 | 3/1989 | Takagi et al. | 395/400 |
| 4,816,991 | 3/1989 | Watanabe et al. | 395/400 |
| 4,843,541 | 6/1989 | Bean et al. | 395/275 |
| 4,849,881 | 7/1989 | Eguchi | 395/425 |
| 4,922,415 | 5/1990 | Hemdal | 395/400 |

*Primary Examiner*—Thomas C. Lee
*Assistant Examiner*—Jennifer M. Orzech
*Attorney, Agent, or Firm*—Fay, Sharpe, Beall, Fagan, Minnich & McKee

[57] ABSTRACT

A virtual computer system having a translation lookaside buffer which converts a virtual address to a real address comprises a register (VMNR) for storing the identification number (VMID) of a currently running virtual machine, the translation lookaside buffer having a bit for holding the VMID and a comparison circuit which compares the VMID held in the bit with the VMID provided by the VMNR and predicates the success of conversion from a virtual address to a real address on the basis of a matching result of comparison, a management table for holding data indicative of VMIDs used to define virtual machines which have run up to the current time point, and a control circuit which, when an invalidation command for the translation lookaside buffer is issued during a run of a virtual machine, selects an unused VMID as first information for defining the running virtual machine on the basis of the contents of the management table and sets the selected VMID in the VMNR.

8 Claims, 4 Drawing Sheets

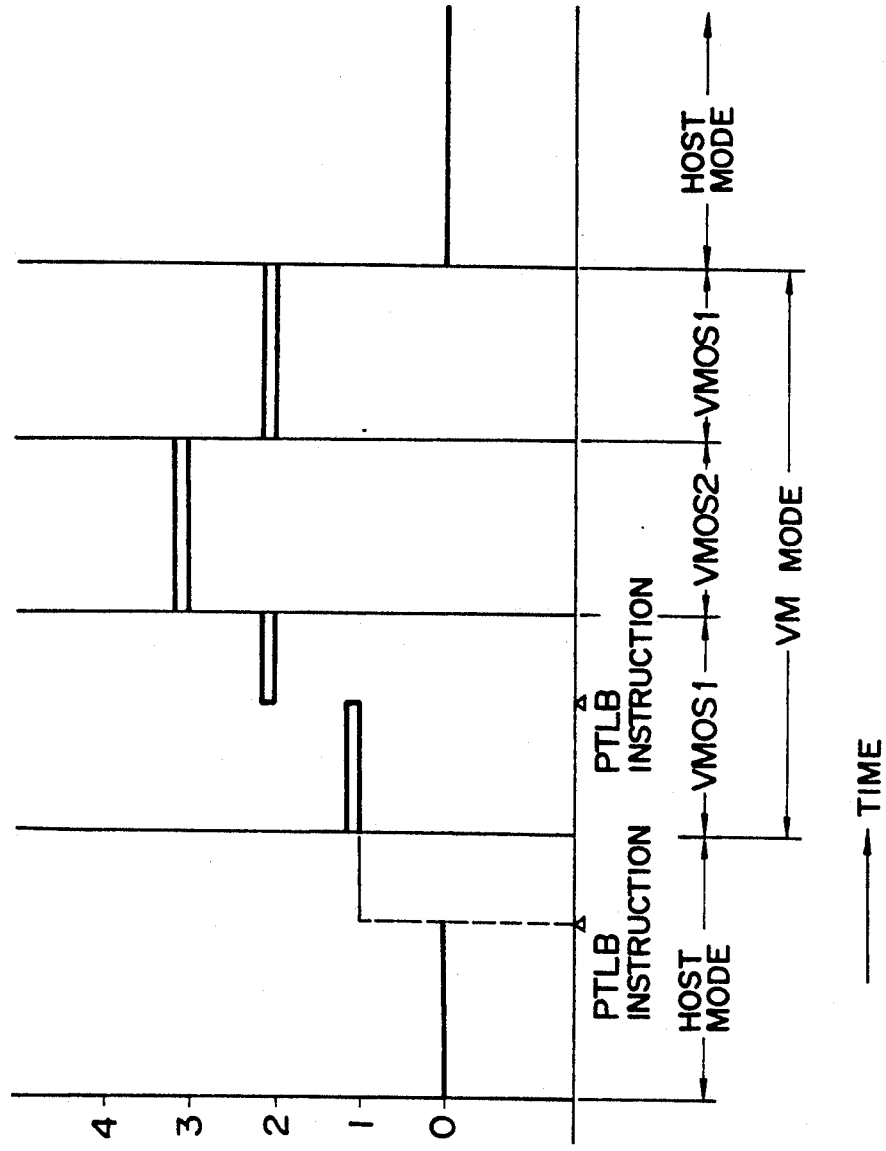

INVALIDATION OF ENTRIES IN A TRANSLATION TABLE BY PROVIDING THE MACHINE A UNIQUE IDENTIFICATION THEREBY DISALLOWING A MATCH AND RENDERING THE ENTRIES INVALID

This is a continuation of co-pending application Ser. No. 07/222,767 filed on Jul. 22, 1988 now abandoned.

BACKGROUND OF THE INVENTION

This invention relates to an information processing system and a method of processing suitable for speeding up the invalidation process for the address transformation buffer.

Simulated computer systems for realizing simultaneous operations of a plurality of operating systems in a single computer system are called "Virtual Machines (VMs)". In contrast to virtual machines, an actual computer is called a "Real Machine". The virtual machines are created through the distribution of resources of the real machine by a virtual machine control program and the simulation by the real machine, so that operating systems are run under the respective virtual machines. Use of this computer ability enables a single real computer system to perform simultaneous, parallel operations of a plurality of operating systems.

In realizing such a virtual computer system with a computer system having a virtual storage system, there exist addresses of three levels as follows:
  Level 1: Real address of main memory (real address for the real machine)
  Level 2: Virtual address for the real machine (real address for a virtual machine)
  Level 3: Virtual address for a virtual machine Generally, a computer with the virtual storage system incorporates a translation lookaside buffer (TLB) in the processor and stores pairs of virtual address and corresponding real address, so that address conversion is implemented in a short time. In the virtual storage system of a virtual computer system, the TLB has a record of pairs of level-3 address and level-1 address, and it is used to carry out 2-stage address conversion from level 3 to level 2 then from level 2 to level 1, which is inherently required of the virtual computer system.

Japanese Patent Kokai (Laid-Open) Nos. 53-101234 and 54-34723 disclose such a virtual computer system, which is provided in TLB entries with pairs of level-3 address and level-1 address, virtual machine identifiers (VMIDs), and VALID bits. The purpose of having a VMID in TLB is to distinguish level-3 addresses of different virtual machines by the TLB.

In the virtual computer system, the TLB invalidation process for a running VM is implemented by resetting the VALID bit of the TLB entry having a VMID equal to the VMID held in the VMID register. Among TLB entries, the entry having a relevant VMID is searched, and its VALID bit is reset.

Japanese Patent Kokai (Laid-Open) No. 60-57449 discloses a virtual computer system, in which is provided a VMID stack for registering a plurality of VMIDs, with the TLB being designed to hold information indicative of the position in the VMID stack (VM stack number) in place of VMID. The system of the above patent publication is intended to avoid the increase in the number of bits of the VMID field in the TLB in the case of increased VM multiplexing. The VM stack number has less number of bits than VMID, and the correspondence between the VM stack number and VMID is retained in the VMID stack. However, the above patent reference does not disclose the total purging of TLB entries pertinent to a running VM.

Current computer systems require an improved address translation technology that overcomes these problems and others and to provide an address translation process that is advanced in purge processing.

SUMMARY OF THE INVENTION

An object of this invention is to reduce the time expended on the invalidation process for the translation lookaside buffer incorporated in the computer.

Another object of this invention is to improve the overall system efficiency by using VMID not only in VM mode, but also in $\overline{VM}$ mode (real machine mode).

According to this invention, a computer having a translation lookaside buffer for converting a virtual address into a real address comprises a register for storing first information which defines a currently running program, the translation lookaside buffer having a bit for holding first information and a comparison circuit which compares the first information held in the bit with the first information provided by the register and predicates the success of conversion from a virtual address to a real address on the basis of a matching result of comparison; a table for holding data indicative of first information which defines programs that have been run up to the current time point; and a control circuit which, when an invalidation command for the transformation lookaside buffer is issued during a run of one program, selects unused first information as first information for defining the one program on the basis of the contents of the table and sets the selected first information in the register.

BRIEF DESCRIPTION OF THE DRAWINGS

The invention may take physical form in certain parts and arrangements of parts which will be described in detail in the specification and illustrated in the accompanying drawing which form a part of and wherein:

FIG. 4 is a diagram showing the transition in the contents of the ID register according to the embodiment of FIG. 3.

DESCRIPTION OF THE PREFERRED EMBODIMENTS

Figure 1:
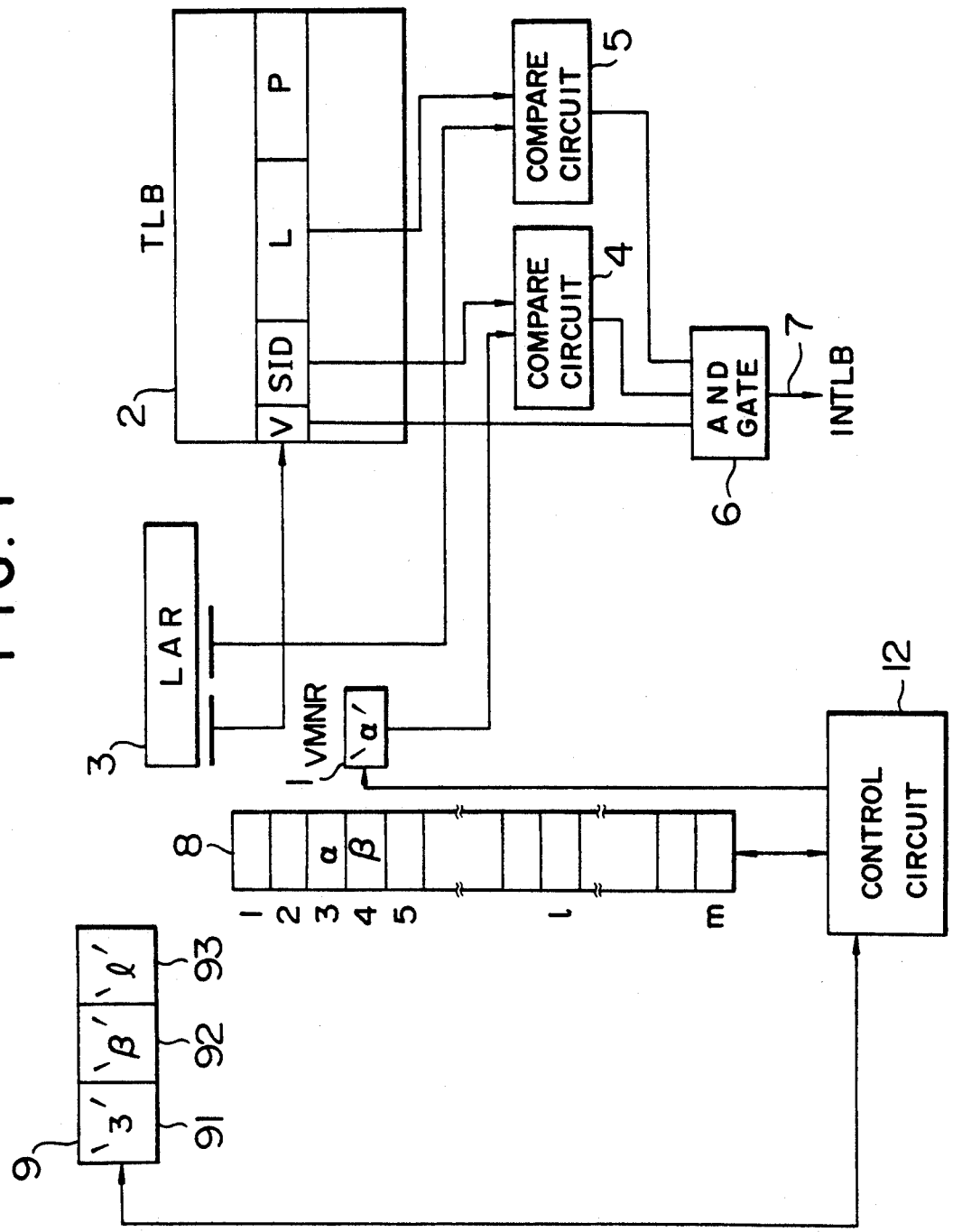
FIG. 1 is a diagram showing an embodiment of this invention applied only to the PTLB command issued in virtual machine mode.

FIG. 1 shows in block diagram the first embodiment of this invention. A virtual computer system pertinent to this invention will be described on FIG. 1.

In the figure, indicated by 1 is a register (VMNR) for holding the identification number (VMID) of a running VM. 2 is a translation buffer (TLB) including entries each made up of a bit (V) indicating the validity of the entry, a VMID field (SID) indicating the VM identification number to which the entry belongs, a virtual address field (L), and a real address field (P). 3 is a register (LAR) for holding the virtual address which is rendered address conversion, and the virtual address of the virtual computer system is held in it. Indicated by 4 and 5 are comparison circuits, and 6 is an AND gate. 8 is a VMID stack having entries of m in number. The entries are numbered 1 through m (stack number), and respective VMIDs are registered in them. 9 is a VMID stack management table. 11 is a control circuit which bases the operation shown in the flowchart of FIG. 2 on a microprogram.

The access method to the virtual machine TLB will be explained in the following. Part of the virtual address of the LAR 3 is used to access a relevant entry, and comparison is implemented by the comparison circuit 5 as to whether the address field (L) read out of the entry is equal to the high-order address section of LAR 3. The entry of TLB 2 has in its VMID field (SID) a record of the value of VMNR 1 at the registration of the entry, and comparison is implemented by the comparison circuit 4 as to whether the VMID field read out of the entry is equal to the identification number of the currently running VM held in the VMNR 1. Each of the comparison circuits 4 and 5 provides a "1" output upon detecting equal inputs. The outputs of the comparison circuits 4 and 5 are received by the AND gate 6 along with the validity indication bit (V) read out of the entry. In response to the equality of the VMID field of the relevant entry of TLB 2 and the VMID of VMNR 1 and the equality of the L field of the entry and the high-order address section of LAR 3 and the presence of a "1" V bit of the entry, the AND gate 6 is enabled to produce a "1" INTLB signal 7. The real address (P) read out of the entry of TLB 2 in this condition is a resulting real address of the real computer.

Next, the process at the issuance of the TLB invalidation command (PTLB command) during a run of a VM operation system (VMOS) with VMID="α" will be explained. The purpose of the PTLB command is to invalidate an entry of TLB which has been registered. When the command is issued for a VMOS with the VMID of "α" (i.e., α-VMOS), the TLB entry which has been registered with VMID="α" is invalidated so that it is not used any longer.

In FIG. 1, the VMID stack 8 stacks VMIDs of VMs which have been dispatched. The VMID stack management table 9 includes three information fields. These areas are:

(1) A field 91 for storing the stack number where the currently running VMID is registered.
(2) A field 92 for storing the maximum value of VMIDs registered in the VMID stack.
(3) A field 93 for storing the number of VM stacks in use.

The following description on the operation of this embodiment is based on the assumption that the field 91 of management table 9 contains "3" indicating that the currently running VMID is stored in the stack section with stack number 3, the field 92 contains "β" indicating that the maximum VMID among VM-OSs which have been dispatched is "β", and the field 93 contains "l" indicating that l stacks out of m stacks are currently used.

Figure 2:
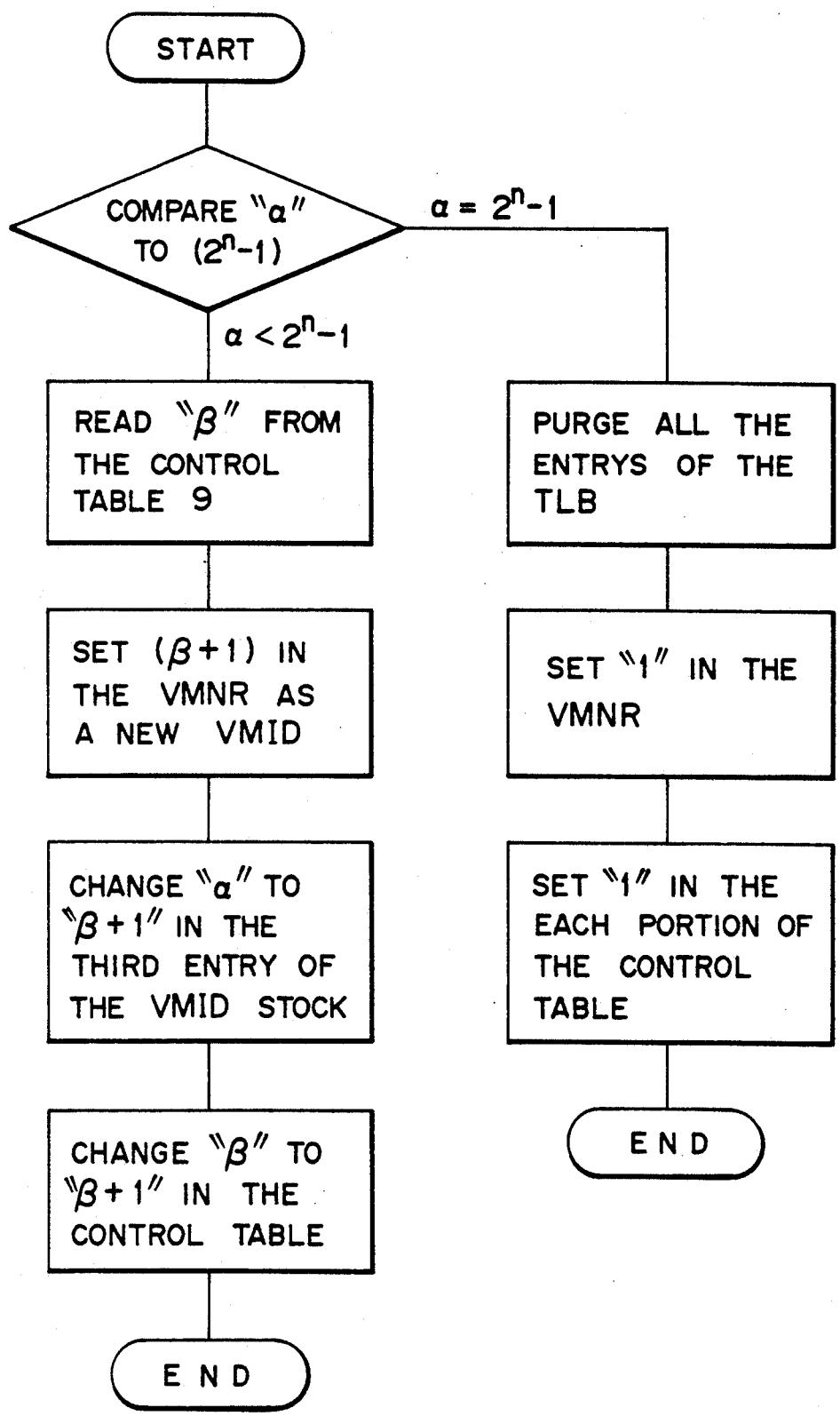
FIG. 2 is a flowchart showing the operation of the control circuit in FIG. 1.

Conventionally, in executing the PTLB command, the TLB has been searched for the entry with VMID="α" and, upon detection, the entry has its V bit reset to "0". In the present invention, the PTLB command of α-VMOS is executed as shown in the flowchart of FIG. 2. With the number of bits of VMNR being n, the value of m is $2^n$ or less.

(1) The current VMID "α" in field 91 is compared with the maximum value $2^n - 1$ of VMID which the system can take.

$\alpha = 2^n - 1$ is followed by the process described later.
$\alpha < 2^n - 1$ is followed by execution of (2).
$\alpha > 2^n - 1$ never occurs.

(2) The maximum value "β" of VMID registered in the VMID stack 8 is obtained in the management table 9. Value $\beta + 1$ is set as a new VMID in VMNR. "α" registered in the third stack of VMID stack is replaced with "$\beta + 1$". "β" in the management table 9 is replaced with $\beta + 1$.

In this embodiment, the currently running VMID is changed from $\alpha$ to $\beta + 1$ by changing the stack section, which is specified by the stack number at which the currently running VMID is registered in the management table 9, to $\beta + 1$. On this account, the following TLB access takes place with the VMNR value being $\beta + 1$, and the entry registered with VMID="β" is detected to be unequal by the comparison circuit 4. Consequently, at a TLB access following this PTLB command, the TLB entry registered with the VMID field (SID) being "β" in the TLB entry is not referenced. This is equivalent to the invalidation of the TLB entry having VMID "β".

When $\beta = 2^n - 1$, all entries of TLB are invalidated, since there is no VMID value which can newly be used. New VMID "1" is set for the VMNR. ("0" represents $\overline{\text{VM}}$ mode.) The management table 9 is assumed to contain from '1', '1', '1' from the left. '1' is registered in the first entry of the VMID stack 8. With all VMIDs being used up, the VMID stack 8 and TLB are renewed completely, and VMID '1' is registered. Although the present invention applied to the virtual computer system has been described, it is not confined to virtual computer systems.

Figure 3:
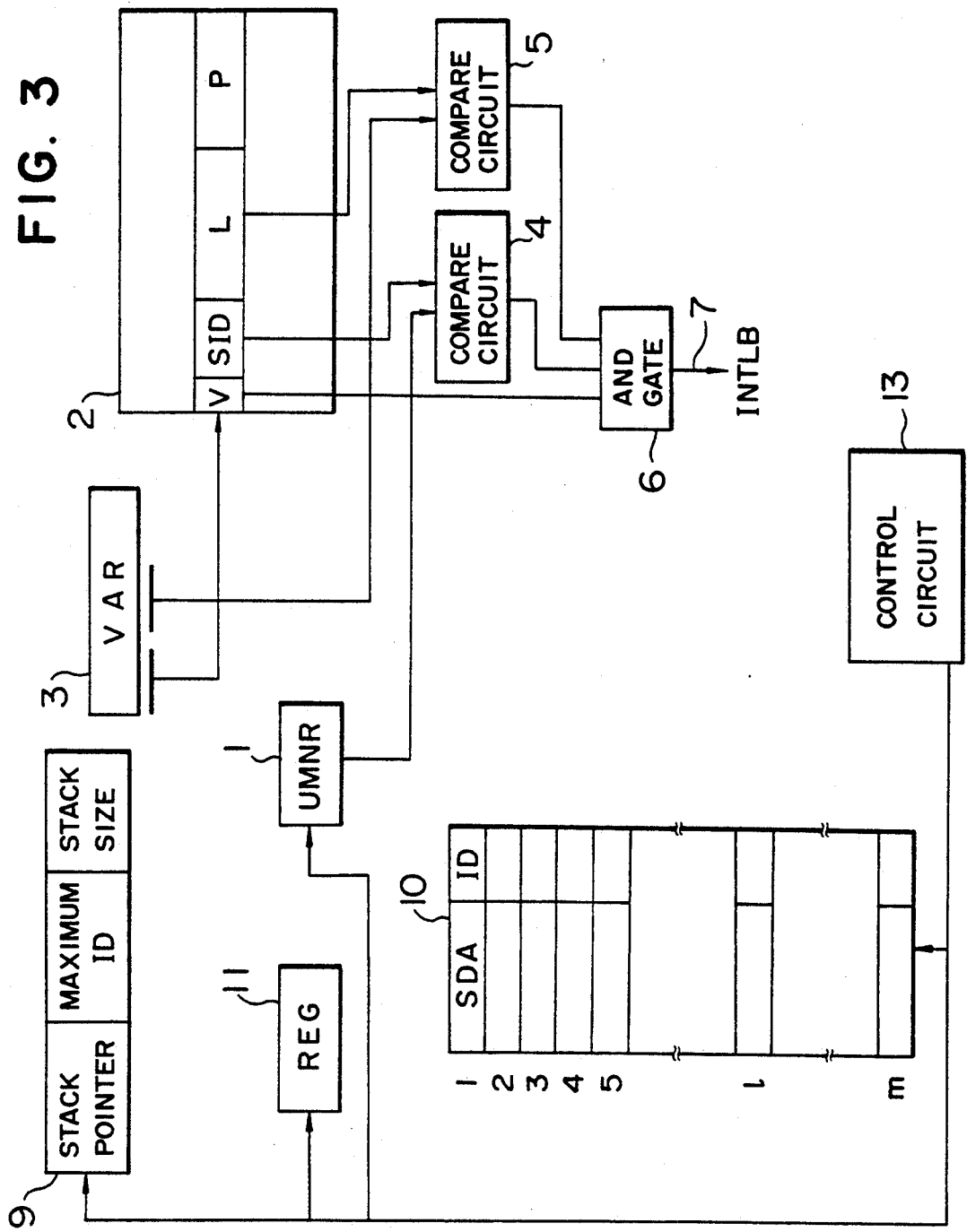
FIG. 3 is a diagram showing an embodiment of this invention applied to the PTLB command issued in VM mode and host mode of the virtual computer system.

FIG. 3 shows the second embodiment of this invention which is applied to the PTLB command issued when the system is not in a VM run. Components identical to those in FIG. 1 are given the common symbols.

In the following discussion, when the system is not in a VM run, i.e., the host operation is in execution, it is called "host mode" in contrast to "VM mode" of a VM run.

In FIG. 3, the VMID stack in FIG. 1 is replaced with an ID stack 10 made up of ID and SDA fields, and an ID register 11 is added. The SDA contains the starting address of data (SD) necessary for the running of VMOS, and it is provided uniquely for each VM. The ID is an identifier used for the access to TLB in host mode, and it is identical to VMID in VM mode.

The following describes the sequence of operation for the dispatching of VM1, VM2 and VM1 after the host mode PTLB command has been issued. The operation is conducted by the microprogram of the control circuit 13.

<1> The system is running in host mode with ID='0'. The ID register 11 is set to '0'.

<2> The PTLB command is issued in host mode. The ID register 11 is incremented by one. When the current value is the maximum value which the ID register 11 can take, the ID register 11 is reset to '0', and the TLB is invalidated for all entries.

<3> VMOS1 is dispatched. Unless the ID register 11 is '0' upon transition from host mode to VM mode, all entries of TLB are invalidated. Next, the ID register 11 is set to "1" regardless of its contents, and the management table 9 and the ID field of ID stack 10 are updated, as in the first embodiment. Namely, the ID field of the first entry of ID stack is set to "1" and the SDA field is set to the SD address (contents of SDA register 11) of VMOS1.

<4> When the PTLB command is issued during a run of VMOS1, the management table 9, the ID field of ID stack 10 and the ID register are updated in accordance with the first embodiment.

<5> Next, VMOS2 is dispatched. When a new VMOS has been dispatched, a new ID is assigned to VM upon confirmation that the SD address 11 is not registered in the ID stack 10. It is sufficient for the ID stack 10 to scan stack entries of only the stack size of the management table 9. Since the same SDA is not found in the ID stack 10, the maximum ID+1 ("3") is alloted to VMOS2 and the management table 9 is updated for each field. One ID entry is added.

<6> VMOS1 is dispatched. The ID stack 10 is searched for the entry having SDA of VMOS1, as in <5>. The stack entry registered in <4> is relevant, and ID of the entry is set in the ID register 1. The stack pointer of the management table 9 is updated so that it points to the entry. The maximum ID and stack size are unchanged.

<7> The system returns to host mode. In returning from VM mode to host mode, the ID register 1 is brought to "0".

FIG. 4 shows the transition of the ID register in the foregoing embodiment. This invention improves the performance of PTLB command. The following describes the effectiveness in the case of the above embodiment.

(1) Usage of This Invention to PTLB Command in VM Mode:

In the conventional technique of invalidating the TLB entry having VMID of running VM, when the PTLB command is issued n times in VM mode, it takes time for scanning all entries of TLB at each PTLB command and time for invalidating all TLB entries having the VMID. According to this invention, TLB is scanned and invalidated only when VMID has exceeded the maximum value. Since the processing time for the PTLB command is extremely shorter than time expended for the TLB scanning, the process is sped up by the TLB access time as compared with the conventional technique.

(2) Usage of This Invention in Host Mode:

The PTLBA processing time is reduced to 1/n (n is the maximum value of VMID) as compared with the conventional technique.

We claim:

1. A system for carrying out an invalidation process with a translation lookaside buffer in a computer system which has a register means for storing identification information identifying a currently running machine state, said translation lookaside buffer having bits for storing identification information in respective columns of the translation lookaside buffer and means for converting a virtual address to a real address, wherein the identification information from the translation lookaside buffer is compared in a compare circuit with the identification information from said register mean, and invalidating said converting the virtual address to the real address when the compare circuit does not detect coincidence between the identification information stored in the register means and the identification information stored in the translation lookaside buffer, said system comprising:

a data holding means for holding data indicative of identification information identifying machine states which have been run up to a current time point;

means, when an invalidation command for said translation lookaside buffer is issued by the system during a run of a one running machine state, for selecting an identification information which does not identify a past running machine state and assigning the selected identification information to the currently running machine state, said selection based on the content of said data holding means wherein the selected identification information reidentifies said one running machine state; and means for setting the selected identification information in said register means whereby all translation lookaside buffer entries with identification information equal to the currently running machine state's prior identification information are simultaneously disabled from being used in the virtual to real address conversion since the compare circuit cannot detect coincidence between the selected identification information stored in the register means and identification information of entries in the translation lookaside buffer, thereby rendering the entries invalid.

2. A method of invalidating entries in a translation table in a computer system, said entries containing translation pairs comprising data to be translated and data representing a result of translation, each entry further holding an identification information for identifying a machine state, aid computer system having a register for storing a current identification information identifying a currently running machine state, and a compare circuit for comparing identification information from one entry of the translation table with the current identification information from aid register, wherein a translation pair from the one entry is used for the translation if said compare circuit detects coincidence, said method comprising the steps of:

issuing an invalidation command for invalidating all translation table entries which hold the current identification information identifying a currently running machine state whereby all the translation table entries with the current identification information are simultaneously disabled from being used in the translation;

in response to the invalidation command, selecting a new identification information which has been used to identify neither the currently running machine state nor a past running machine state and assigning the selected new identification information to the currently running machine state; and, storing the selected new identification information int he register, whereby said currently running machine state is reidentifies by the selected new identification information whereby the compare circuit cannot detect coincidence between the selected new identification stored in the register and the identification information of entries stored in the translation table, thereby rendering the entries invalid.

3. The method according to claim 2 wherein said machine state represents a virtual machine 4. A system for carrying out an invalidation process of entries in a translation lookaside buffer in a computer system which has a register mean for storing identification information identifying a currently running machine state, said translation lookaside buffer having bits for storing identification information in respective columns of the translation lookaside buffer and means for conversion of a virtual address to a real address, wherein the identification information from the translation lookaside buffer is compared with the identification information from said register means, wherein conversion from a virtual address to real address is responsive to the comparison, said system comprising:

- a table means for holding data comprising a plurality of identification information identifying virtual machines which have been run up to a current time point;
- means for selecting an identification information which does not define a past running virtual machine and assigning the selected identification information to the currently running virtual machine, said selection based on the contents of said holding means wherein the selected identification information reidentifies a currently running virtual machine; and,
- means for setting the selected information in said register means, in response to an invalidation command for said translation lookaside buffer being issued during a run of said running virtual machine whereby all translation lookaside buffer entries with identification information equal to the currently running virtual machine prior identification information are simultaneously disabled from being used in the virtual to real address conversion since the compare circuit cannot detect coincidence between the selected identification stored in the register and the identification information of the entries stored in the translation lookaside buffer, thereby rendering the entries invalid.

5. A computer having a virtual storage system having a register for holding an execution status identity for identifying a currently running virtual machine and an address translation buffer for holding an execution status identity in each entry thereof, wherein an equality detected by a compare circuit between said execution status identity of an entry of the buffer and said execution status identity of said register comprises a one condition representing an existence of an objective virtual address in said address translation buffer when said computer converts said virtual address to a corresponding real address, said computer comprising means for storing execution status identities which are contained in entries of the translation buffer, means for obtaining a value which is not registered in the storing means as an execution status identity, and means for setting said obtained value as an execution status identity for reidentifying said currently running virtual machine in said register and means for invalidating all address translation buffer entries with execution status identity the same as the currently running virtual machine's prior execution status identity, in response to an invalidation command being issued during said currently running virtual machine for said address translation buffer whereby all the entries are simultaneously disabled from being used in the virtual to real address conversion since the compare circuit cannot detect equality between the execution status identity stored in the register and the execution status identity of entries stored in the address translation buffer, thereby rendering the entries invalid.

6. A system for carrying out an invalidation process of a translation table having a plurality of entries each holding translation pairs comprising data to be translated and data representing a result of translation, each entry holding identification information to identify a plurality of translation pairs, said computer system having register means for storing identification information identifying a currently running machine state, means for comparing the identification information from said register means, wherein the success of a conversion of data to be translated into data representing the result of translation is predictable based on the comparison, said system comprising:

- means for obtaining, when invalidating all entries which hold identification information identifying the currently running machine's state, an identification information which does not identify a past running machine state and assigning the obtained identification information to the currently running machine state wherein the obtained identification information reidentifies the currently running machine state; and,
- means for storing the obtained identification information in said register means whereby all translation table entries with identification information equal to the current machine state's prior identification information are simultaneously disabled from being used in the translation since the comparing means cannot detect coincidence between the selected identification stored in the register and the identification information of entries stored in the translation table, thereby rendering the entries invalid.

7. An apparatus comprising:
- a translation lookaside buffer including:
  - a virtual address field for storing virtual addresses:
  - a real address field for recording real addresses which are associated with said virtual addresses;
  - a validation indication field; and,
  - a virtual machine (VM) identification number field (SID) for storing a VM identification number;
- a first register for storing one of the virtual addresses to be converted and for storing an information indicating an associated virtual computer system;
- a second register for storing a selected one of the VM identification numbers which is associated with a running virtual machine;
- a comparison circuit for detecting an equality between a one of the virtual addresses stored in said virtual address field and said one virtual address stored in said first register and for detecting an equality between the selected VM identification number stored in the second register and said VM identification number stored in said VM identification number field of said translation lookaside buffer;
- an AND-circuit controlled by said comparison circuit for providing a signal indicating that a one of the real addresses stored in the real address field of said translation lookaside buffer is the one of the real addresses into which the one virtual address stored in said first register is to be converted;
- a stack means for storing in table form, data indicative of identification information numbers which have been stored in the second register up to a current time point; and,
- a control circuit means for, when an invalidating command for said translation lookaside buffer is issued by the apparatus, selecting an identification information number from identification numbers which do not identify a fast running virtual machine and assigning the selected identification information number to a currently running virtual machine, wherein the selected identification number reidentifies the currently running virtual machine and for storing said selected identification information number into said stack, and for storing the selected identification information number in said second register whereby all translation lookaside buffer entries equal with identification information numbers equal to the currently running virtual machine's prior identification information numbers are simultaneously disabled form being used in the conversion since the comparison circuit cannot detect equality between the identification information number stored in the second register and the identification information numbers of entries stored in the translation lookaside buffer, thereby rendering the entries invalid.

8. The apparatus according to claim 7, wherein said stack has a plurality of entries (2 . . . m) for storing starting addresses of data for running virtual operating systems and for storing identification numbers associated with said starting addresses.

* * * * *

UNITED STATES PATENT AND TRADEMARK OFFICE
CERTIFICATE OF CORRECTION

PATENT NO. : 5,317,710
DATED : May 31, 1994
INVENTOR(S) : Mari Ara, et al.

It is certified that error appears in the above-indentified patent and that said Letters Patent is hereby corrected as shown below:

Claim 1, column 5, line 62, delete "mean" and substitute therefor --means--.

Claim 2, column 6, lines 32 and 37, delete "aid" and substitute therefor --said--;
 lines 54-55, delete "int he" and substitute therefor --in the--; and,
 line 56, delete "reidentifies" and substitute therefor --reidentified--.

Claim 4, column 6, line 67, delete "mean" and substitute therefor --means--.

Claim 6, column 8, line 2, after "table" insert --in a computer system, said translation table--.

Signed and Sealed this

Thirtieth Day of August, 1994

Attest:

BRUCE LEHMAN

*Attesting Officer*      *Commissioner of Patents and Trademarks*